(12) United States Patent
Kondo

(10) Patent No.: US 9,253,441 B2
(45) Date of Patent: Feb. 2, 2016

(54) CONFERENCE SYSTEM, PROGRAM AND CONFERENCE METHOD

(71) Applicant: Brother Kogyo Kabushiki Kaisha, Nagoya-shi, Aichi-ken (JP)

(72) Inventor: Yoshiyuki Kondo, Okazaki (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/499,398

(22) Filed: Sep. 29, 2014

(65) Prior Publication Data

US 2015/0015661 A1 Jan. 15, 2015

Related U.S. Application Data

(63) Continuation of application No. PCT/JP2013/058004, filed on Mar. 21, 2013.

(30) Foreign Application Priority Data

Mar. 28, 2012 (JP) ................................. 2012-073033

(51) Int. Cl.
*H04N 7/15* (2006.01)
*H04N 7/14* (2006.01)
(Continued)

(52) U.S. Cl.
CPC .............. *H04N 7/15* (2013.01); *H04L 12/1822* (2013.01); *H04M 3/42221* (2013.01); *H04M 3/567* (2013.01); *H04N 7/147* (2013.01); *H04L 12/1863* (2013.01)

(58) Field of Classification Search
CPC . H04M 3/567; H04L 12/1822; H04L 12/1863

USPC ........................................ 348/14.08; 709/204
See application file for complete search history.

(56) References Cited

U.S. PATENT DOCUMENTS 5,818,514 A * 10/1998 Duttweiler ............... H04N 7/15
348/14.01
7,061,863 B2 6/2006 Watanabe et al.
(Continued)

FOREIGN PATENT DOCUMENTS

JP H07-123172 A 5/1995
JP 2001-177573 A 6/2001
(Continued)

OTHER PUBLICATIONS

Jun. 11, 2013—International Search Report—PCT/JP2013/058004—English Translation.

*Primary Examiner* — Creighton Smith
(74) *Attorney, Agent, or Firm* — Banner & Witcoff, Ltd.

(57) ABSTRACT

There is provided a conference system which performs a remote conference by communicating conference data between a transmission terminal and a reception terminal. The transmission terminal receives input of the conference data including audio data, selects a real time mode of sequentially performing transmission of the input audio data and a package mode of performing transmission of the input audio data for each input of a predetermined unit amount, records the input audio data in the predetermined unit amount to generate audio record data when the package mode is selected, and transmits the input audio data to the reception terminal when the real time mode is selected and transmits the audio record data to the reception terminal when the package mode is selected. The reception terminal outputs the received input audio data preferentially over the received audio record data.

20 Claims, 9 Drawing Sheets

(51) Int. Cl.
*H04M 3/42* (2006.01)
*H04M 3/56* (2006.01)
*H04L 12/18* (2006.01)

(56) References Cited

U.S. PATENT DOCUMENTS

| | | | |
|---|---|---|---|
| 8,694,326 B2* | 4/2014 | Miyasaka | H04M 9/082 370/235 |
| 2001/0004352 A1 | 6/2001 | Watanabe et al. | |
| 2011/0305343 A1* | 12/2011 | Lee | G06F 3/162 381/22 |
| 2014/0372908 A1* | 12/2014 | Kashi | H04L 65/403 715/753 |

FOREIGN PATENT DOCUMENTS

| JP | 2002-335299 A | 11/2002 |
|---|---|---|
| JP | 2006-074359 A | 3/2006 |
| JP | 2008-104118 A | 5/2008 |
| JP | 2010-093505 A | 4/2010 |

* cited by examiner

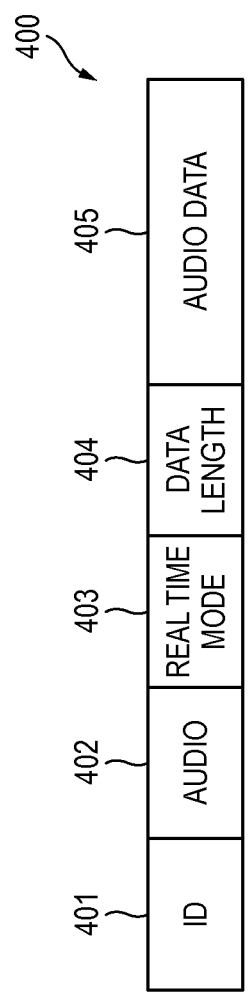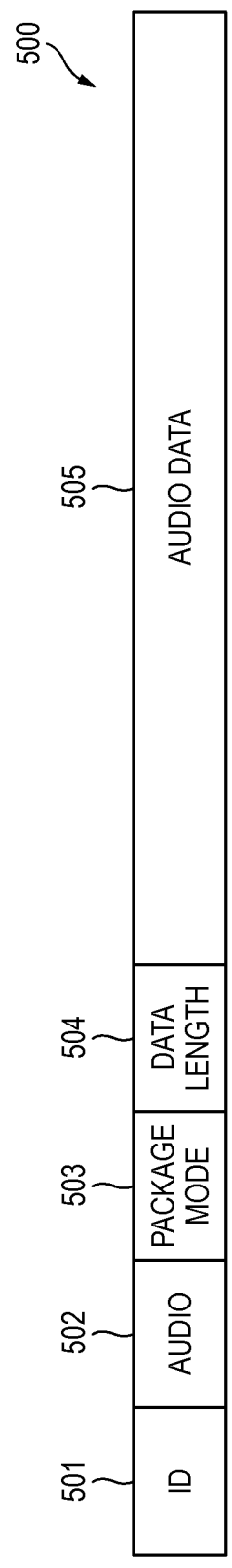
FIG. 4
FIG. 5

CONFERENCE SYSTEM, PROGRAM AND CONFERENCE METHOD

CROSS-REFERENCE TO RELATED APPLICATION

This is a Continuation-in-Part of International Patent Application No. PCT/JP2013/058004 filed Mar. 21, 2013, which claims the benefit of Japanese Patent Application No. 2012-073033 filed Mar. 28, 2012. The disclosures of the prior applications are hereby incorporated by reference herein in their entireties.

TECHNICAL FIELD

This disclosure relates to a conference system, a program of a terminal device and a conference method for transmitting and receiving conference data between terminal devices positioned at a plurality of locations and connected to one another through a network and reproducing the conference data by the terminal devices positioned at the individual locations, thereby performing a remote conference among the locations remote from one another.

BACKGROUND

When performing a remote conference among a plurality of locations, a remote conference system transmits and receives conference data such as video data and audio data among the individual locations. Terminal devices positioned at the individual locations reproduce the video data and the audio data which are transmitted and received.

Recently, there has been proposed a technique in which a transmission condition of a communication network is detected, and a distribution of a communication band for video data and a communication band for audio data is determined according to the detected transmission condition.

SUMMARY

However, in this technique, even if a distribution of the communication bands for video data and audio data is determined according to the transmission condition of the communication network, in a poor transmission condition, video data and audio data cannot be appropriately transmitted and received. Therefore, for example, there is a problem that participants at the individual locations cannot accurately grasp the contents of the remote conference due to reasons such as an interruption of video data or audio data to be reproduced.

This disclosure provides a conference system, a program of a terminal device and a conference method in which a transmission source terminal device has a package mode of transmitting audio data for each input of a predetermined unit amount as well as a real time mode of sequentially transmitting audio data, and by selecting the package mode, the transmission source terminal device can surely transmit audio data to a reception destination terminal device.

According to an illustrative embodiment of the present invention, there is provided a conference system configured to perform a remote conference by transmitting and receiving conference data among a plurality of terminals through a network, the terminals including a transmission terminal for transmitting conference data and a reception terminal for receiving the conference data. The transmission terminal comprises: a first processor; and first memory storing first computer-readable instructions, the first instructions, when executed by the first processor, causing the transmission terminal to perform operations comprising: a receiving operation receiving input of the conference data, the conference data including audio data; a selecting operation selecting either one of a real time mode of sequentially performing transmission of the input audio data received by the receiving operation and a package mode of performing transmission of the input audio data for each input of a predetermined unit amount; an audio recording operation recording the input audio data in the predetermined unit amount to generate audio record data when the package mode is selected by the selecting operation; and a communication control operation transmitting the input audio data to the reception terminal when the real time mode is selected by the selecting operation, and transmitting the audio record data to the reception terminal when the package mode is selected by the selecting operation. The reception terminal comprises: a second processor; and second memory storing second computer-readable instructions, the second instructions, when executed by the second processor, causing the reception terminal to perform operations comprising: a storing operation storing the input audio data transmitted by the communication control operation in a first storage device, and storing the audio record data transmitted by the communication control operation in a second storage device; and an outputting operation outputting the input audio data stored in the first storage device preferentially over the audio record data stored in the second storage device.

According to another illustrative embodiment of the present invention, there is provided a non-transitory computer-readable medium having a computer program stored thereon and readable by a computer for controlling a terminal device for performing a remote conference by communicating conference data with a partner terminal connected through a network, the computer program, when executed by the computer, causing the computer to perform operations comprising: a receiving operation receiving input of the conference data, the conference data including audio data; a selecting operation selecting either one of a real time mode of sequentially performing transmission of the input audio data received by the receiving operation and a package mode of performing transmission of the input audio data for each input of a predetermined unit amount; an audio recording operation recording the input audio data in the predetermined unit amount to generate audio record data when the package mode is selected by the selecting operation; and a communication control operation transmitting the input audio data to the reception terminal when the real time mode is selected by the selecting operation, and transmitting the audio record data to the reception terminal when the package mode is selected by the selecting operation.

According to a further illustrative embodiment of the present invention, there is provided a non-transitory computer-readable medium having a computer program stored thereon and readable by a computer for controlling a terminal device for performing a remote conference by communicating conference data with a partner terminal connected through a network, the computer program, when executed by the computer, causing the computer to perform operations comprising: a mode receiving operation receiving mode information representing either one of a real time mode of sequentially performing transmission of input audio data of the conference data received from the partner terminal, and a package mode of performing transmission of the input audio data in a predetermined unit amount; a storing operation storing the input audio data received from the partner terminal in a first storage device, and storing audio record data which is acquired by recording the input audio data received by the partner terminal in the predetermined unit amount, in a second storage device; and an outputting operation outputting the input audio data stored in the first storage device preferentially over the audio record data stored in the second storage device.

According to a further illustrative embodiment of the present invention, there is provided a conference method of performing a remote conference by transmitting and receiving conference data among a plurality of terminals through a network, the terminals including a transmission terminal for transmitting conference data and a reception terminal for receiving the conference data. The conference method comprises: by the transmission terminal, receiving input of the conference data, the conference data including audio data; selecting either one of a real time mode of sequentially performing transmission of the input audio data received by the receiving step and a package mode of performing transmission of the input audio data for each input of a predetermined unit amount; recording the input audio data in the predetermined unit amount to generate audio record data when the package mode is selected by the selecting step; and transmitting the input audio data to the reception terminal when the real time mode is selected by the selecting step, and transmitting the audio record data to the reception terminal when the package mode is selected by the selecting step, and by the reception terminal, storing the input audio data transmitted by the transmitting step in a first storage device, and storing the audio record data transmitted by the transmitting step in a second storage device; and outputting the input audio data stored in the first storage device preferentially over the audio record data stored in the second storage device.

According to the above configuration, it is possible to select a mode for transmitting audio data to the package mode. In the package mode, when transmission of audio record data of input audio data of the predetermined unit amount is completed, the next audio data of the predetermined unit amount is recorded. Therefore, even in a poor communication condition, the transmission terminal can surely transmit the input audio data to the reception terminal, without discarding audio data exceeding storage capacity. Further, when there is audio data transmitted in the real time mode, the reception terminal preferentially outputs the audio data of the real time mode, thereby capable of maximizing the real-time property of the remote conference. The reception terminal outputs audio data of the package mode, thereby enabling a participant to grasp contents of the remote conference.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 4 is an explanatory view showing an example of audio data for a real time mode according to an illustrative embodiment of this disclosure;

FIG. 5 is an explanatory view showing an example of audio data for a package mode according to an illustrative embodiment of this disclosure;

DETAILED DESCRIPTION

Hereinafter, a conference system, a program of a terminal device and a conference method according to illustrative embodiments of this disclosure will be described in detail with reference to the accompanying drawings.

Figure 1:
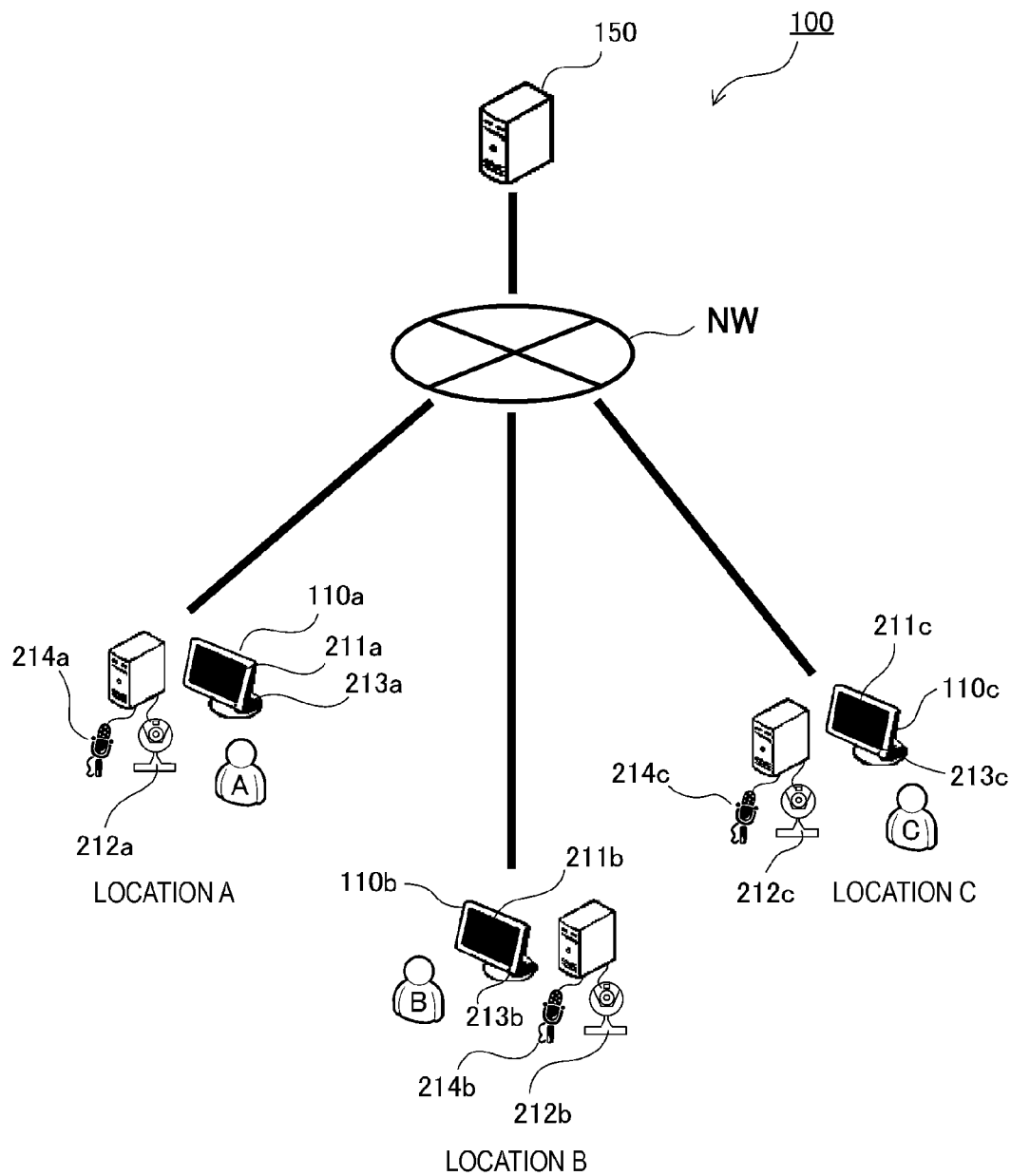
FIG. 1 is an explanatory view showing an example of a remote conference system according to an illustrative embodiment of this disclosure.
Figure 2:
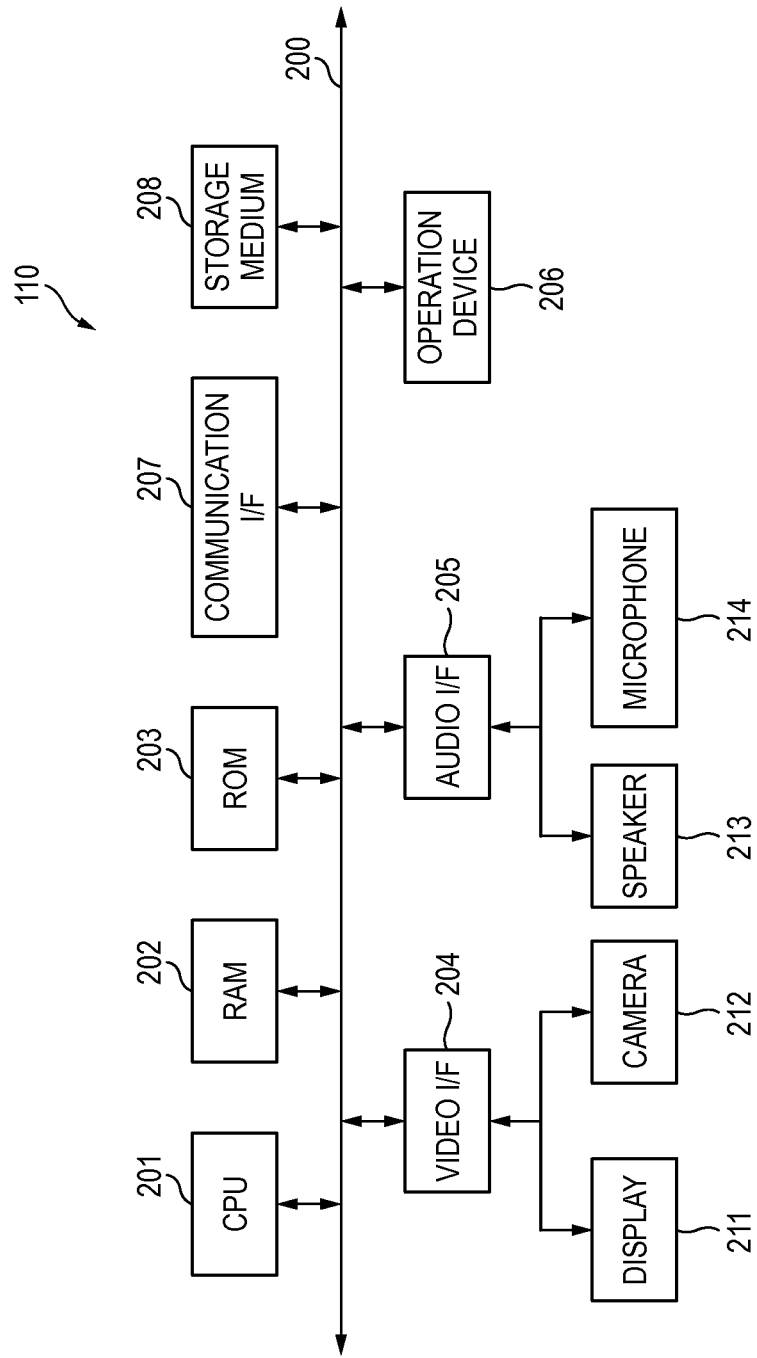
FIG. 2 is an explanatory view showing an example of the hardware configuration of a remote conference terminal according to an illustrative embodiment of this disclosure.
Figure 3:
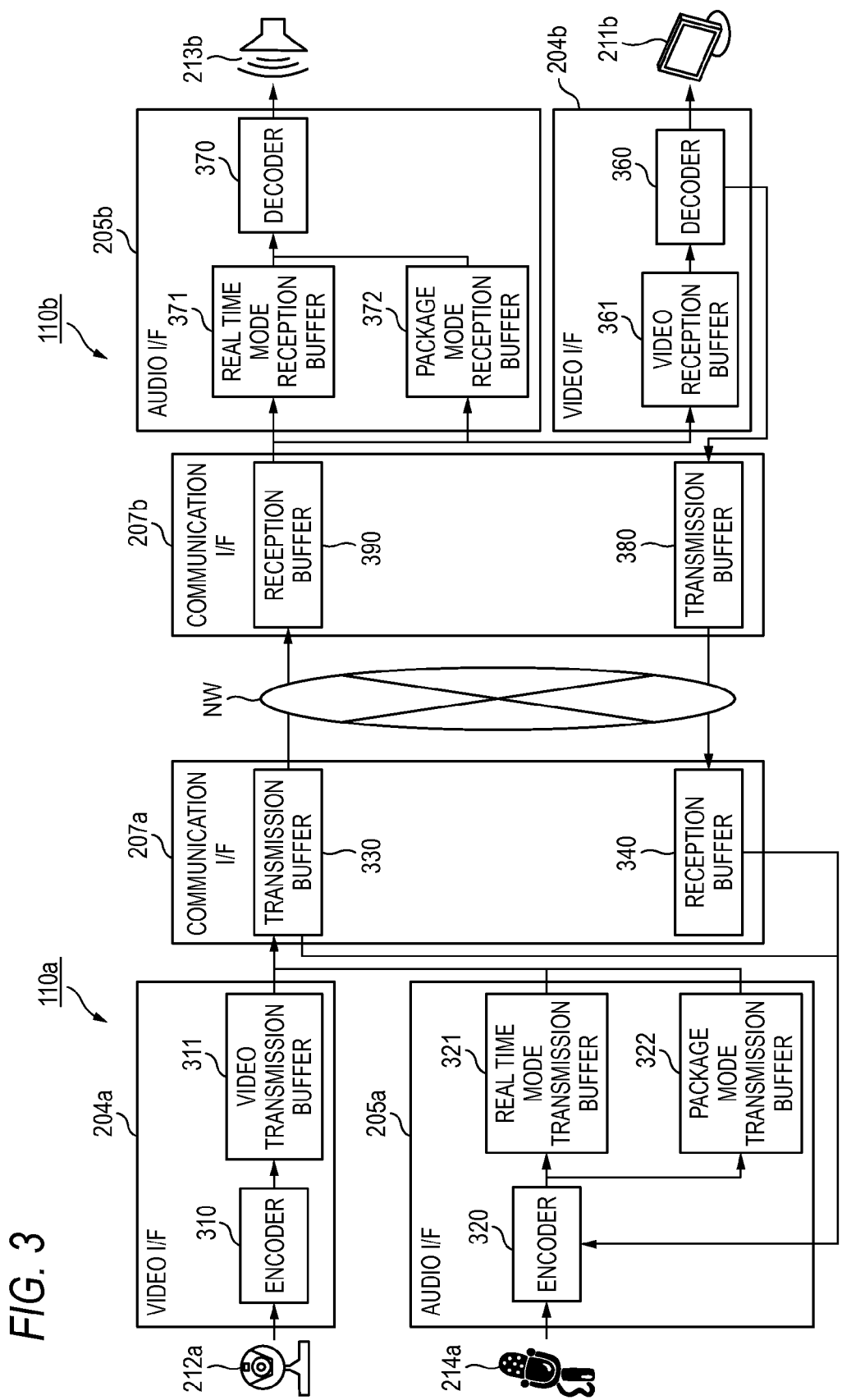
FIG. 3 is an explanatory view showing an example of transmission and reception of video data and audio data in the remote conference system according to an illustrative embodiment of this disclosure.

With reference to FIGS. 1 to 3, there will be described a case where a terminal device according to an illustrative embodiment of this disclosure is applied to a remote conference terminal to be used in a remote conference system for performing a remote conference at a plurality of locations. In the present illustrative embodiment, a transmission terminal, a reception terminal and a terminal device of this disclosure are implemented by remote conference terminals 110 (110a, 110b and 110c) placed at individual locations A, B and C. A conference system according to this disclosure is implemented by a remote conference system 100 in which the plurality of remote conference terminals 110 are connected to one another through a network NW.

In FIG. 1, the remote conference terminals 110a, 110b and 110c placed at the individual locations A, B and C, and a management server 150 are connected to one another through the network NW, whereby the remote conference system 100 is configured. In the remote conference system 100, the remote conference terminals 110a, 110b and 110c placed at the individual locations A, B and C geographically apart from one another and the management server 150 are connected to one another through the network NW such as the Internet, or the remote conference terminals 110a, 110b and 110c placed at the individual locations A, B and C apart from one another inside a building, and the management server 150 are connected to one another through the network NW such as a local area network (LAN). Also, the network NW may be a public telephone network or the like.

In the following description, unless the individual locations need to be distinguished from one another, a description will be made without the affixes "a", "b" and "c" at the ends of reference numerals. Also, in the present illustrative embodiment, a configuration in which the remote conference terminals 110a, 110b and 110c perform a remote conference through the management server 150 will be described. However, the remote conference terminals 110a, 110b and 110c may be connected to one another by peer to peer (P2P) communication to perform a remote conference.

In the remote conference system 100, the remote conference terminals 110 transmit and receive video data and audio data of participants A, B and C at the individual locations A, B and C and participating in a remote conference, as conference data. Specifically, each remote conference terminal 110 acquires video and audio (e.g., voice) of a participant at the location of the corresponding remote conference terminal 110, through a camera 212 and a microphone 214 connected to the corresponding remote conference terminal 110. Each remote conference terminal 110 generates video data and audio data to be transmitted based on the acquired video and audio of the participant at the location of the corresponding remote conference terminal 110. Each remote conference terminal 110 transmits the video data and the audio data generated, together with a terminal ID identifying the corresponding remote conference terminal 110, and a conference ID identifying the remote conference in which the corresponding remote conference terminal 110 is participating, to the management server 150 through the network NW. In the management server 150, the terminal IDs of remote conference terminals 110 which are used by participants participating in each remote conference are stored in association with the conference ID of the corresponding remote conference. Based on the conference ID, the management server 150 transmits the video data and the audio data received from each remote conference terminal 110, to other remote conference terminals 110 associated with the terminal ID of the corresponding remote conference terminal 110 which is the transmission source and positioned at other locations.

Each remote conference terminal 110 receives video data and audio data of participants transmitted from the other remote conference terminals 110, from the management server 150 through the network NW. Each remote conference terminal 110 reproduces the video data and the audio data of the location of the corresponding remote conference terminal 110, and the video data and the audio data of the participants of the other locations from the received data, by a display 211 and a speaker 213.

That is, each remote conference terminal 110 reproduces the video data and the audio data of the participants transmitted and received between the location of the corresponding remote conference terminal 110 and the other locations. The participant of each location watches video and audio generated by reproducing the video data and the audio data by the remote conference terminal 110 of the corresponding location, thereby performing the remote conference among the participants positioned away from one another.

With reference to FIG. 2, the hardware configuration of the remote conference terminal 110 according to the illustrative embodiment of this disclosure will be described.

In FIG. 2, the remote conference terminal 110 includes a central processing unit (CPU) 201, a random access memory (RAM) 202, a read only memory (ROM) 203, a video I/F 204, an audio I/F 205, a communication I/F 207 which controls communication with an external device, and storage media 208 which store a various information. The video I/F 204 controls input/output of various video data for the display 211 and the camera 212 connected to the remote conference terminal 110. The audio I/F 205 controls input/output of various audio data for the speaker 213 and a microphone 214 connected to the remote conference terminal 110. An operation device 206 receives input of various information. Examples of the operation device 206 include a mouse and a keyboard connected to the remote conference system 100. The individual components of the remote conference terminal 110 are connected to one another by a bus 200. The video I/F 204 includes an encoder 310, a video transmission buffer 311, a decoder 360 and a video reception buffer 361, in order to transmit and receive video data, as will be described below in detail. The audio I/F 205 includes an encoder 320, a real time mode transmission buffer 321, a package mode transmission buffer 322, a decoder 370, a real time mode reception buffer 371 and a package mode reception buffer 372, in order to transmit and receive audio data. The communication I/F 207 includes a transmission buffer 330 or 380 and a reception buffer 340 or 390.

The CPU 201 performs control on the whole of the remote conference terminal 110. The CPU 201 uses the RAM 202 as a work area, and executes various programs read from the ROM 203.

The video I/F 204 controls the display 211 according to control of the CPU 201 such that the display 211 displays various information. For example, the video I/F 204 decodes video data of the location of the remote conference terminal 110, which is acquired by the camera 212, and video data which is received from the remote conference terminals 110 of the other locations, and controls the display 211 such that the display 211 displays the decoded video data. The video I/F 204 controls the display 211 according to control of the CPU 201 such that the display 211 displays data images for the remote conference and processed images of the remote conference.

According to control of the CPU 201, the video I/F 204 captures an image of the participant of the location of the remote conference terminal 110 by the camera 212. The video I/F 204 outputs the video data of the participant acquired by the camera 212, to the video transmission buffer 311 (to be described below), according to control of the CPU 201.

The audio I/F 205 controls the speaker 213 according to control of the CPU 201 such that the speaker 213 outputs various audio. The audio I/F 205 decodes audio data received from the remote conference terminals 110 of the other locations, and controls the speaker 213 such that the speaker 213 outputs the decoded audio data. The audio I/F 205 controls the speaker 213 according to control of the CPU 201 such that the speaker 213 outputs a guidance voice relating to the remote conference with the other locations.

The audio I/F 205 collects the voice of the participant of the location of the remote conference terminal 110 by the microphone 214, according to control of the CPU 201. The audio I/F 205 outputs the audio data of the participant collected by the microphone 214, to the real time mode transmission buffer 321 or the package mode transmission buffer 322 (to be described below), according to control of the CPU 201.

The operation device 206 receives input of various information from the participant or the like. The operation device 206 is configured by a mouse, a touch panel, operation buttons, and the like, and receives input of information related to the remote conference, a selection of a transmission mode (to be described below), and the like, as signals, and outputs the input signals to the CPU 201.

The communication I/F 207 is connected to the network NW such as the

Internet, through a communication line, thereby being connected to the other remote conference terminals 110 and any other external device through the network NW. The communication I/F 207 takes charge of an interface between the network NW and the inside of the remote conference terminal 110, and controls input/output of data with respect to an external device. As the communication I/F 207, for example, a modem, a LAN adapter, or the like can be used.

The communication I/F 207 transmits video data and audio data of the location of the remote conference system 100 to the remote conference terminals 110 of the other locations through the network NW according to control of the CPU 201. The communication I/F 207 transmits the video data and the audio data to the management server 150 through the network NW according to control of the CPU 201.

Figure 11:
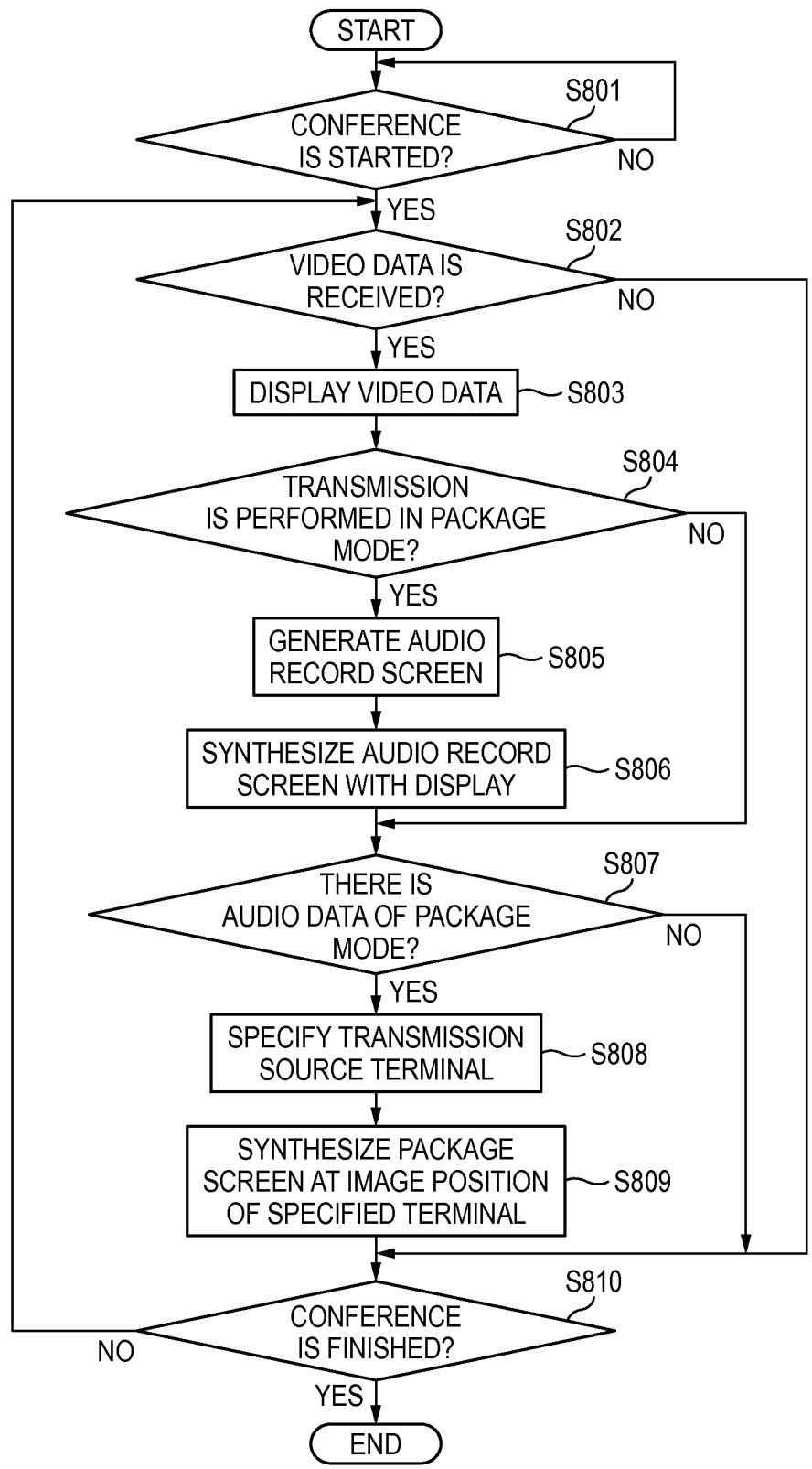
FIG. 11 is a flow chart showing a display process according to an illustrative embodiment of this disclosure.

The storage media 208 are non-transitory storage media which store control programs for performing processes shown in FIGS. 6, 7 and 11 (to be described below). The storage media 208 are, for example, a hard disk (HD), a flexible disk (FD), a flash memory, and the like. Drive devices for the storage medium 208 are provided, and various data is stored in the storage media 208 according to control of the CPU 201. Also, from the storage media 208, data is read according to control of the drive devices for them. The CPU 201 reads control programs stored in a non-transitory storage medium such as a CD-ROM or a DVD-ROM, through a reading device (not shown) such as an optical media drive connected to the remote conference terminal 110, thereby installing the control programs stored in the storage media 208. Alternatively, the CPU 201 may download control programs stored in a non-transitory storage medium such as an HD provided in an external download server, through the communication I/F 207, thereby installing the control programs in the storage media 208.

Now, with reference to FIG. 3, the overview of transmission and reception of video data and audio data in the remote conference system 100 of this disclosure will be described. In the description of FIG. 3, a case where video data and audio data which are conference data are transmitted from the remote conference terminal 110a to the remote conference terminal 110b will be described. Also, the transmission-related function of the remote conference terminal 110a which is a transmission terminal (a conference data transmission source), and the reception-related function of the remote conference terminal 110b which is a reception terminal (a conference data reception destination) will be described. In FIG. 3, the management server 150 shown in FIG. 1 is not shown, and the description of FIG. 3 will be made on the assumption that conference data is transmitted and received through the network NW.

In FIG. 3, the remote conference terminal 110a performs control such that video acquired by the camera 212a is output to the encoder 310 of the video I/F 204a according to control of the CPU 201a. The encoder 310 encodes video data for transmitting the input video to the remote conference terminal 110b, and outputs the video data to the video transmission buffer 311. The video I/F 204a outputs the video data stored in the video transmission buffer 311, to the transmission buffer 330 of the communication I/F 207a, according to control of the CPU 201a.

The remote conference terminal 110a performs control such that audio received by the microphone 214a is output to the encoder 320 of the audio I/F 205a according to control of the CPU 201a. The encoder 320 encodes audio data for transmitting the input audio to the remote conference terminal 110b, and outputs the audio data to the real time mode transmission buffer 321 or the package mode transmission buffer 322.

The real time mode transmission buffer 321 of the remote conference terminal 110a is a buffer to store audio data when a real time mode is selected as a transmission mode. The real time mode is, for example, a transmission mode of converting audio input from the microphone 214a into audio data of an unit of about 20 msec, and sequentially transmitting the audio data.

In the real time mode, the audio input by the microphone 214a is encoded by the encoder 320, regardless of whether transmission of audio data from the communication I/F 207a to the remote conference terminal 110b which is the reception destination has been completed. The encoded audio data is stored in the real time mode transmission buffer 321 and in the transmission buffer 330, and is transmitted from the communication I/F 207a to the remote conference terminal 110b which is the reception destination.

The package mode transmission buffer 322 of the remote conference terminal 110a is a buffer to store audio data when a package mode is selected as the transmission mode. The package mode is, for example, a transmission mode of converting audio input from the microphone 214a into audio data of an unit of about 10 sec and transmitting the audio data.

In the package mode, after transmission of audio data from the communication I/F 207a to the remote conference terminal 110b which is the reception destination is completed, audio newly input by the microphone 214a is encoded by the encoder 320. The encoded audio data is stored in the package mode transmission buffer 322 and in the transmission buffer 330, and is transmitted from the communication I/F 207a to the remote conference terminal 110b which is the reception destination. In other words, in the package mode, after transmission of audio data which is an input of a predetermined unit amount is completed, the next audio input is accepted.

In the present illustrative embodiment, a description will be made on the assumption that in a case of transmitting audio data in the package mode, transmission of video data is stopped. That is, during the package mode, it is possible to surely transmit audio data of the package mode by stopping transmission of video data.

Now, with reference to FIGS. 4 and 5, audio data for the real time mode and audio data for the package mode will be described.

In FIG. 4, audio data 400 for the real time mode is composed of the identification information 401 of a transmission source terminal device, a data type 402, a mode type 403, a data length 404 representing data amount, and real time mode audio data 405. Specifically, for example, the identification information 401 is the terminal ID of the remote conference terminal 110a, and the data type 402 is audio, and the mode type 403 is the real time mode, and the data length 404 is about 50 bytes which is audio of about 20 msec.

In FIG. 5, audio data 500 for the package mode is composed of the identification information 501 of a transmission source terminal device, a data type 502, a mode type 503, a data length 504 representing data amount, and package mode audio data 505. Specifically, for example, the identification information 501 is the terminal ID of the remote conference terminal 110a, and the data type 502 is audio, and the mode type 503 is the package mode, and the data length 504 is about 25 Kbytes which is audio of about 10 sec.

Referring to FIG. 3, transmission mode selection will be described.

Transmission mode selection is performed by the CPU 201a. Specifically, if an operation input of the participant on the operation device 206 (to be described below) is received, a transmission mode is set according to the operation input by the CPU 201a. The CPU 201a performs control on the audio IT 205a and the communication IT 207a based on the set transmission mode, thereby performing transmission and reception of the audio data (to be described below). Accordingly, it is possible to surely transmit the audio data 500 as necessary for the participant.

In a case where transmission is performed in the real time mode, when it is determined that audio data has been stored longer than a predetermined period in the transmission buffer 330, the package mode may be selected as the transmission mode by the CPU 201*a*. In other words, if the CPU 201*a* determines, as a stacking condition of a transmission buffer, that the amount of the audio data 400 stored in the transmission buffer 330 is a predetermined amount or greater (for example, 2,500 bytes or greater), the package mode may be selected. Accordingly, it is possible to surely transmit audio data 500 even in a condition where transmission of the audio data 400 does not progress.

When it is determined that a difference between the amount of audio data 400 transmitted from the communication IT 207*a* and the amount of audio data 400 received by the communication I/F 207*b* for a predetermined period has become a predetermined amount or greater, the package mode may be selected as the transmission mode by the CPU 201*a*. In other words, when the CPU 201*a* acquires the reception amount of audio data 400 for the predetermined period, from the remote conference terminal 110*b*, and determines that a transmission delay related to the audio data 400 transmitted for the predetermined period is larger than a predetermined amount, the CPU 201*a* selects the package mode. Accordingly, it is possible to surely transmit the audio data 500 even in a condition where continuous reproduction is difficult due to an increase in the transmission delay of the audio data 400 caused by a bad communication condition.

Also, the CPU 201*a* may select the transmission mode according to a video data reproduction condition in the remote conference terminal 110*b* which is the reception destination. Specifically, the remote conference terminal 110*a* acquires the number of pictures of video data reproduced for a predetermined period (e.g., a frame rate) by the decoder 360 of the remote conference terminal 110*b*. In a case of determining that the acquired number of pictures is equal to or less than a predetermined number (for example, 0.2 fps which is 0.2 frames per second), the CPU 201*a* selects the package mode. Accordingly, it is possible to surely transmit the audio data 500 even if the communication condition is a bad condition when the communication condition is determined based on the video data.

In the above described example, the transmission mode is selected according to an operation input of the participant, a stacking condition of the transmission buffer, a transmission delay, or a video reproduction condition. The transmission mode may be selected according to a combination of an operation input of the participant, a stacking condition of the transmission buffer, a transmission delay, and a video reproduction condition, or by means for detecting any other communication condition.

According to the transmission mode selected or set by the CPU 201*a*, the communication IX 207*a* of the remote conference terminal 110*a* transmits video data or the audio data 400 or 500 stored in the transmission buffer 330, to the remote conference terminal 110*b* through the network NW. Specifically, the transmission mode is temporarily stored by the CPU 201*a*, and when the real time mode is selected according to the transmission mode which is temporarily stored, the communication I/F 207*a* transmits video data and the audio data 400 for the real time mode, to the remote conference terminal 110*b*. When the package mode is selected, the communication I/F 207*a* transmits the audio data 500 for the package mode, to the remote conference terminal 110*b*. When the audio data 500 is transmitted in the package mode, after transmission of the audio data 500 is completed, transmission of the video data is restarted.

The reception buffer 340 of the remote conference terminal 110*a* receives information related to the amount of the audio data 400 received for the predetermined period, and the number of pictures of video data reproduced for the predetermined period, from the remote conference terminal 110*b*. The reception buffer 340 outputs the information related to the amount of the audio data 400, and the information related to the number of pictures, to the encoder 320, according to the control of the CPU 201*a*. According to the transmission mode selected based on the information related to the amount of the audio data 400 and the information related to the number of pictures, the encoder 320 encodes the audio data 400 or 500 according to control of the CPU 201*a*.

The remote conference terminal 110*b* reproduces the video data or the audio data 400 or 500 received from the remote conference terminal 110*a* through the network NW, according to control of the CPU 201*b*. The remote conference terminal 110*b* stores the video data or the audio data 400 or 500 received by the communication I/F 207*b*, in the reception buffer 390. According to control of the CPU 201*b*, the communication I/F 207*b* outputs the data to the real time mode reception buffer 371 or the package mode reception buffer 372 of the audio I/F 205*b* and the video reception buffer 361 of the video I/F 204*b* according to the type of the data stored in the reception buffer 390.

The real time mode reception buffer 371 of the remote conference terminal 110*b* stores the audio data 400 for the real time mode. The real time mode reception buffer 371 outputs the audio data 400 for the real time mode to the decoder 370 each time when a predetermined amount (for example, an amount of about 100 msec) of audio data 400 is stored.

The package mode reception buffer 372 of the remote conference terminal 110*b* stores the audio data 500 for the package mode. After the holding of the audio data 500 is completed based on the data length 504 of the audio data 500, if there is no audio data 400 remaining in the real time mode reception buffer 371, the package mode reception buffer 372 outputs the audio data 500 to the decoder 370.

The decoder 370 of the remote conference terminal 110*b* decodes the audio data 400 or 500 input from the real time mode reception buffer 371 or the package mode reception buffer 372, and controls the speaker 213*b* such that the speaker 213*b* reproduces the audio data. Specifically, in a case where decoding of the audio data 400 for the real time mode is completed, if there is audio data 500 for the package mode, the decoder 370 decodes the audio data 500. Accordingly, it is possible to surely reproduce the audio data 500 while securing a real-time property in reproducing the audio data 400.

The video reception buffer 361 of the remote conference terminal 110*b* stores the video data. The video reception buffer 361 outputs the video data having been stored, to the decoder 370. The decoder 360 decodes the video data having been input from the video reception buffer 361, and controls the display 211*b* such that the display 211*b* reproduces the video data. During reproduction of the video data by the display 211*b*, the decoder 360 outputs the number of pictures of video data reproduced for the predetermined period, to the transmission buffer 380.

The transmission buffer 380 of the remote conference terminal 110*b* transmits information related to the number of pictures of video data reproduced for the predetermined time, and information related to the reception amount of audio data 400 for the predetermined period, to the remote conference terminal 110a through the network NW.

In the example of FIG. 3, a case where the buffers capable of temporarily holding data are provided respectively in the video I/F 204, the audio I/F 205 and the communication I/F 207 has been described. However, the storage media 208 and the RAM 202 may be used as those buffers.

If the individual components are described in association with respective functions, the function of a receiving unit of this disclosure is implemented by the video I/F 204 and the audio I/F 205 shown in FIG. 2. The functions of a selecting unit and a mode setting unit of this disclosure are implemented by the CPU 201, the audio I/F 205, the operation device 206 and the communication I/F 207. The function of a communication control unit of this disclosure is implemented by the CPU 11 and the communication I/F 207. The function of a storing unit of this disclosure is implemented by the CPU 201 and the audio I/F 205. The function of an outputting unit of this disclosure is implemented by the CPU 201 and the audio I/F 205.

Figure 6:
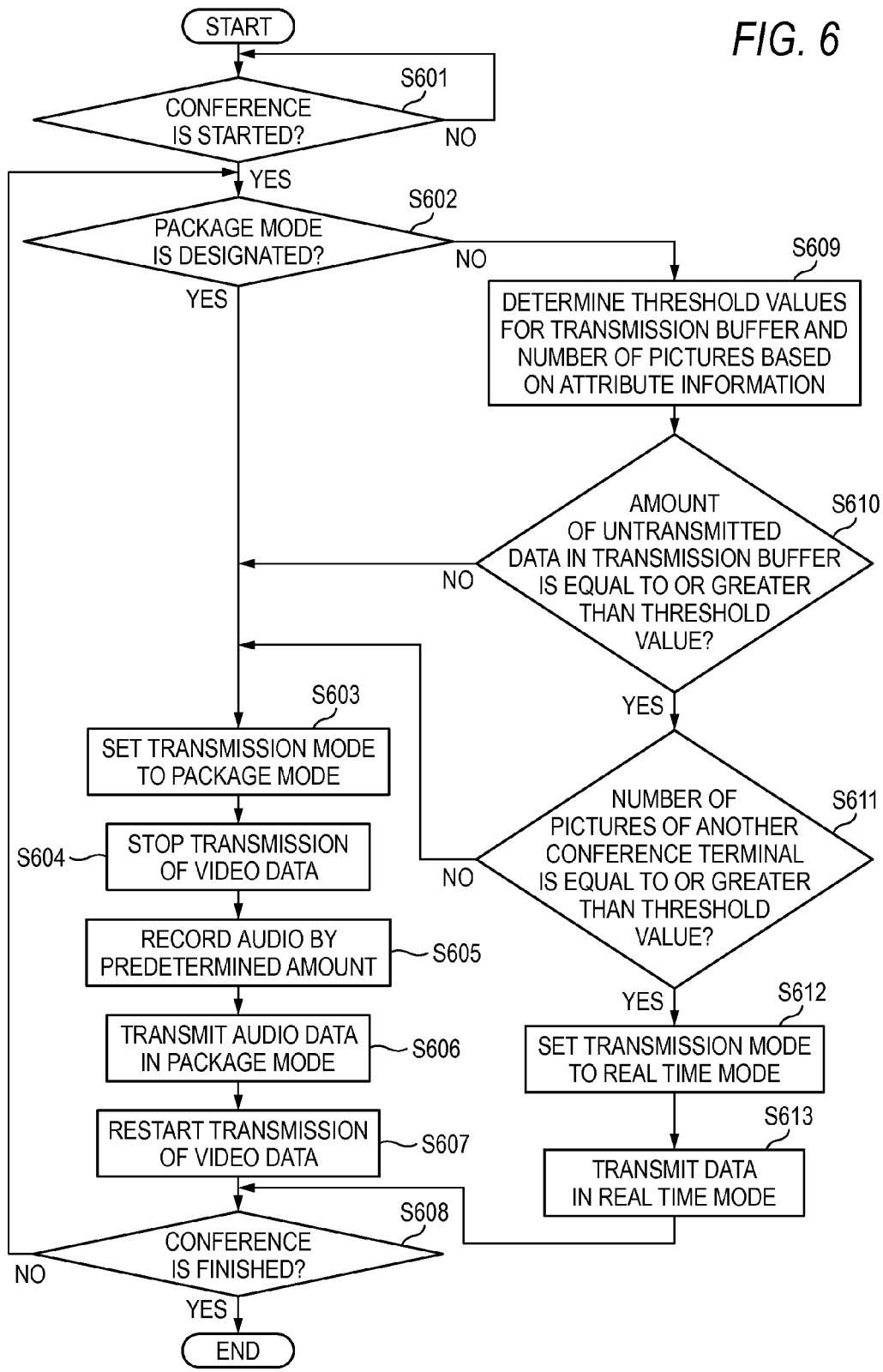
FIG. 6 is a flow chart showing processes of a television terminal which is a conference data transmission source according to an illustrative embodiment of this disclosure.
Figure 7:
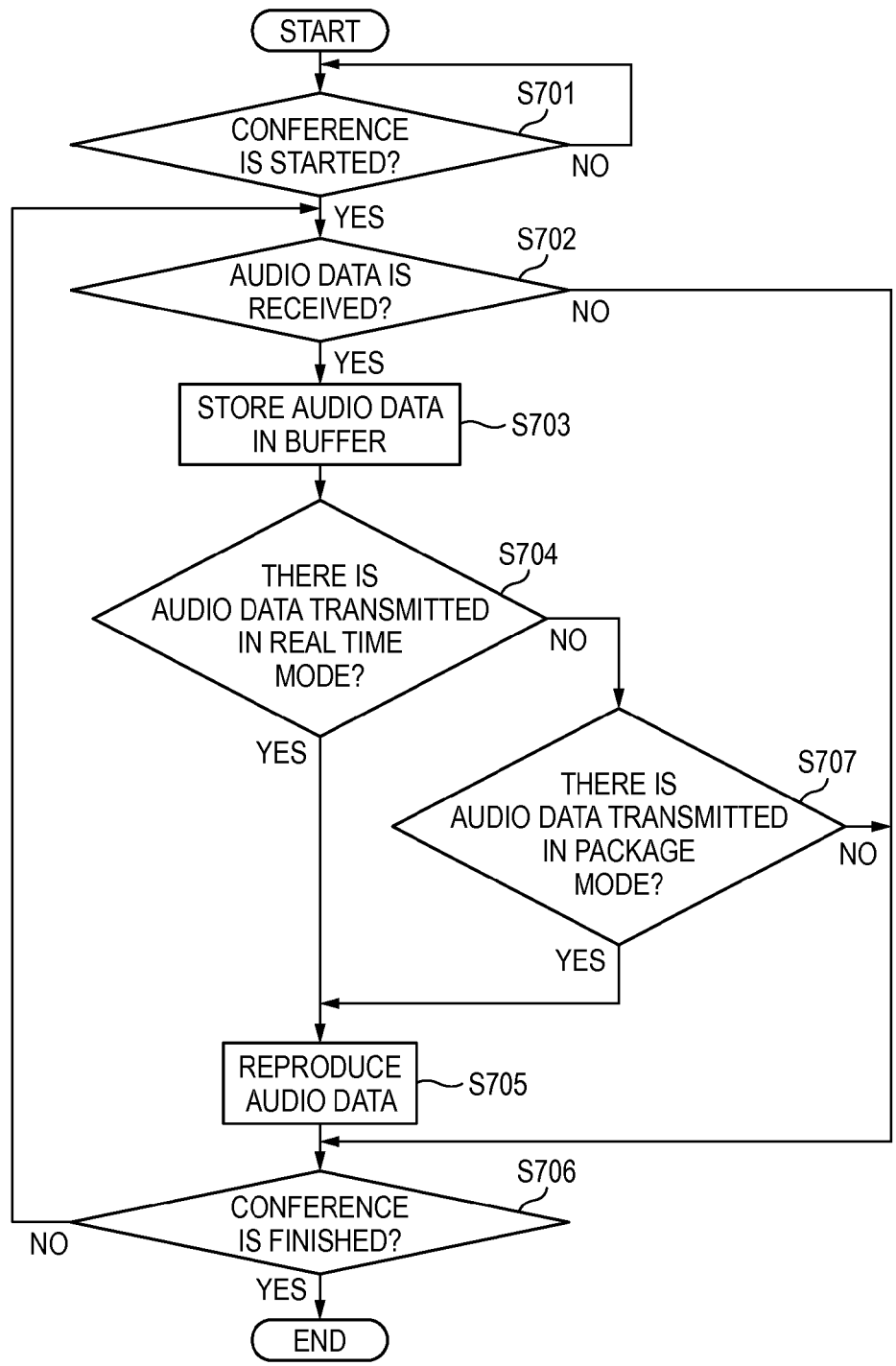
FIG. 7 is a flow chart showing processes of a television terminal which is a conference data reception destination according to an illustrative embodiment of this disclosure.

With reference to FIGS. 6 and 7, processes of the remote conference system 100 according to the illustrative embodiment of this disclosure will be described. With reference to the flow chart of FIG. 6, a process of the remote conference terminal 110a functions as the transmission source will be described. The flow charts of FIGS. 6 and 7 are performed when a conference application which is for performing a remote conference and is stored in the storage media 208 is started.

In the flow chart of FIG. 6, first, the CPU 201a determines whether a remote conference is started (Step S601). At a start of a remote conference, a connection request is made to the management server 150 through the communication I/F 207a, for example, based on an operation on the operation device 206 by the participant. This connection request includes the terminal ID of the remote conference terminal 110a, the conference ID of a remote conference in which the remote conference terminal 110a will participate, and the attribute information (for example, a moderator, a participant, or the like) of the remote conference terminal 110a. The attribute information of the remote conference terminal 110a is stored also in the RAM 202a. When receiving a response from the management server 150 through the communication I/F 207, the CPU 201a determines that the remote conference is started.

Similarly, another remote conference terminal 110b also makes a connection request to the management server 150.

In Step S601, the CPU 201a waits for the remote conference to be started, and when the remote conference is started ("Yes" in Step S601), the CPU 201a determines whether to transmit audio data among video data and the audio data which are input from the camera 212a and the microphone 214a, in the package mode (Step S602). Specifically, the CPU 201a determines whether the package mode is selected, based on an operation input of the participant, which is received by the operation device 206a.

Figure 8:
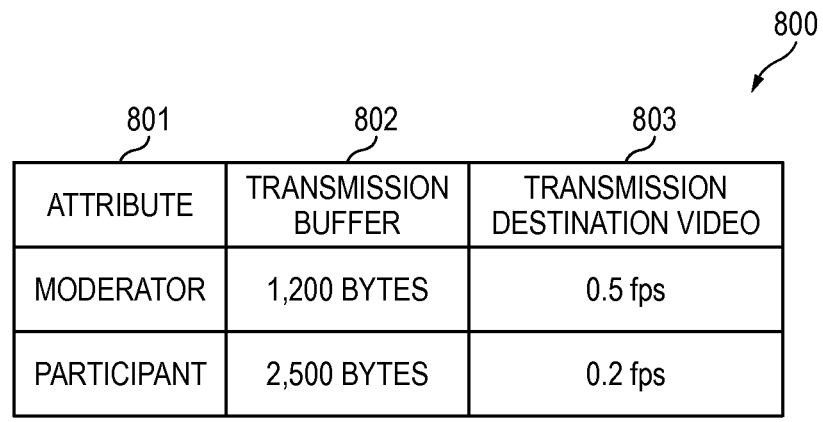
FIG. 8 is an explanatory view showing an example of attributes of participants and threshold values for determining communication conditions according to a modified illustrative embodiment of this disclosure.

When it is determined in Step S602 not to transmit the audio data in the package mode ("No" in Step S602), the CPU 201a determines a threshold value for the transmission buffer 330 to be used in Step S610, and a threshold value for the number of pictures of a partner location to be used in Step S611, based on the attribute information. For this determination, a determination table 800 shown in FIG. 8 is used. In the determination table 800, attribute sections 801 representing the attributes of the participant, transmission buffer sections 802 representing the amounts of the stacking conditions of the transmission buffer, and transmission destination video sections 803 representing the video reproduction conditions of the transmission destination are associated with one another. The determination table 800 is stored in advance in the storage medium 208 or the like.

The CPU 201a reads the determination table 800 from the storage medium 208a, and determines the threshold values. Specifically, the CPU 201a refers to the attribute information stored in the RAM 202a in Step S601. When the attribute information of the remote conference terminal 110a represents a moderator, the CPU 201a determines the amount of audio data 400 to be stored in the transmission buffer 330, to 1,200 bytes, as a threshold value for the stacking condition of the transmission buffer. Meanwhile, when the attribute information of the remote conference terminal 110a represents a participant, the CPU 201a determines the amount of audio data 400 to be stored in the transmission buffer 330, to 2,500 bytes, as the threshold value for the stacking condition of the transmission buffer. The determined threshold value is stored in the RAM 202a.

When the attribute information of the remote conference terminal 110a represents a moderator, the CPU 201a determines the threshold value for the number of pictures of video data reproduced in the reception destination for the predetermined time, to 0.5 fpm. Meanwhile, when the attribute information of the remote conference terminal 110a represents a participant, the CPU 201a determines the threshold value for the number of pictures of video data reproduced in the reception destination for the predetermined time, to 0.2 fpm. The determined threshold value is stored in the RAM 202a. Thereafter, the CPU 201a proceeds with the process to Step S610.

In Step S610, the CPU 201a acquires the amount of audio data 400 stored in the transmission buffer 330. When Step S610 is performed for the first time after start of the remote conference, since transmission of video data and audio data has not been yet started, the amount of audio data 400 stored in the transmission buffer 330 is zero. The CPU 201a determines whether the acquired amount of audio data 400 is equal to or greater than the threshold value for the stacking condition of the transmission buffer, which is determined in Step S609. For example, when the attribute information of the remote conference terminal 110a represents a moderator, the CPU 201a determines whether the acquired amount of audio data 400 is 1,200 bytes or greater. When the attribute information of the remote conference terminal 110a represents a participant, the CPU 201a determines whether the acquired amount of audio data 400 is 2,500 bytes or greater. That is, as compared to normal participants, the moderator selects the package mode in a stage where the transmission buffer is used with smaller amount. Therefore, as compared to normal participants, the moderator making more important remarks can surely transmit audio data. When the result of the determination of Step S610 is positive ("Yes" in Step S610), the CPU 201a proceeds with the process to Step S603. Meanwhile, when the result of the determination of Step S610 is negative ("No" in Step S610), the CPU 201a proceeds with the process to Step S611.

In Step S611, the CPU 201a acquires the number of pictures of video data reproduced for the predetermined time in the reception destination, from another remote conference terminal 110b through the management server 150. The CPU 201a determines whether the acquired number of pictures is equal to or greater than the threshold value for the number of pictures, which is determined in Step S609. For example, when the attribute information of the remote conference terminal 110a represents a moderator, the CPU 201a determines whether the acquired number of pictures is 0.5 fps or greater. When the attribute information of the remote conference terminal 110a represents a participant, the CPU 201a determines whether the acquired number of pictures is 0.2 fps or greater. That is, as compared to normal participants, the moderator more promptly detects deterioration in the video reproduction condition and selects the package mode. Therefore, as compared to normal participants, the moderator making more important remarks can surely transmit audio data. When the result of the determination of Step S610 is positive ("Yes" in Step S611), the CPU 201a proceeds with the process to Step S603. When Step S611 is performed for the first time after start of the remote conference, the result of the determination of Step S611 becomes positive. Meanwhile, when the result of the determination of Step S610 is negative ("No" in Step S611), the CPU 201a proceeds with the process to Step S612.

In Step S612, the CPU 201a sets the audio data transmission mode to the real time mode. The real time mode is a transmission mode of converting audio input from, for example, the microphone 214a into audio data of an unit of about 20 msec and sequentially transmitting the audio data. The CPU 201a stores this setting in the RAM 202a.

The CPU 201a controls the video I/F 204a, the audio I/F 205a and the communication I/F 207a, thereby transmitting video data and audio data input from the camera 212a and the microphone 214a, together with the terminal ID of the remote conference terminal 110a and the conference ID of the remote conference in which the remote conference terminal 110a is participating, to the management server 150, in the real time mode. The management server 150 transmits the video data and the audio data received, to another remote conference terminal 110b, with reference to terminal IDs associated with the conference ID.

The CPU 201a determines whether the remote conference is finished (Step S608). Finishing of the remote conference is performed, for example, in response to an instruction based on an operation on the operation device 206a by the participant, an instruction received from another remote conference terminal 110b through the communication IX 207a, or the like.

When it is determined in Step S608 that the remote conference is not finished ("No" in Step S608), the CPU 201a returns to Step S602, and repeats the processes. When it is determined in Step S608 that the remote conference is finished ("Yes" in Step S608), the CPU 201a finishes the series of processes.

When it is determined in any one of Step S602, Step S610 and Step S611 to transmit data in the package mode, the CPU 201a sets the audio data transmission mode to the package mode (Step S603). The CPU 201a stores this setting in the RAM 202a. The package mode is a transmission mode of converting audio input from, for example, the microphone 214a into audio data of an unit of about 10 sec and transmitting the audio data.

The CPU 201a controls the video I/F 204a and the communication I/F 207a, thereby stopping transmission of the video data, which is input to the camera 212a, to another remote conference terminal 110b connected in Step S601 (Step S604). By stopping transmission of the video data, it is possible to reduce a video data transmission load, and surely transmit the audio data in the package mode. Also, it is possible to achieve synchronization with the audio data in the package mode.

The CPU 201a controls the audio I/F 205a, thereby recording audio input from microphone 214a by a predetermined amount (Step S605). Specifically, the CPU 201a controls the audio I/F 205a, thereby performing a process of recording audio input from the microphone 214a, and causing the package mode transmission buffer 322 to hold audio data of about 10 sec.

When recording of the predetermined amount finishes, the CPU 201a controls the audio I/F 205a and the communication I/F 207a, thereby transmitting the audio data stored in Step S605, together with the terminal ID of the remote conference terminal 110a and the conference ID of the remote conference in which the remote conference terminal 110a is participating, to the management server 150, in the package mode (Step S606). The management server 150 transmits the video data and the audio data received, to another remote conference terminal 110b, with reference to terminal IDs associated with the conference ID.

When transmission of a predetermined amount of audio data according to the package mode in Step S606 is completed, the CPU 201a controls the video I/F 204a and the communication I/F 207a, thereby restarting transmission of the video data input to the camera 212a, to another remote conference terminal 110b connected in Step S601 (Step S607).

Then, the CPU 201a determines whether the remote conference is finished (Step S608). Finishing of the remote conference is performed, for example, in response to an instruction based on an operation on the operation device 206a by the participant, an instruction received from another remote conference terminal 110b through the communication I/F 207a, or the like.

When it is determined in Step S608 that the remote conference is not finished ("No" in Step S608), the CPU 201a returns to Step S602, and repeats the processes. When it is determined in Step S608 that the remote conference is finished ("Yes" in Step S608), the CPU 201a finishes the series of processes.

Processes which are performed by the remote conference terminal 110b which is the reception destination will be described with reference to FIG. 7. In the flow chart of FIG. 7, it is assumed that, among video data and audio data which are conference data, the video data is sequentially reproduced in the order in which the video data is received. Also, it is assumed that the remote conference terminal 110b sequentially transmits the number of pictures of video data reproduced, to the remote conference terminal 110a which is the transmission source, through the management server 150. Here, especially, a process of receiving and reproducing the audio data will be described.

In the flow chart of FIG. 7, first, the CPU 201b determines whether a remote conference is started (Step S701). Start of a remote conference makes a connection request to another remote conference terminal 110a through the communication I/F 207b, for example, based on an operation on the operation device 206b by the participant. When receiving a response from another remote conference terminal 110a through the communication I/F 207b, the CPU 201b determines that the remote conference is started.

In Step S701, the CPU 201b waits for the remote conference to be started, and when the remote conference is started ("Yes" in Step S701), the CPU 201b determines whether any audio data is received from the management server 150 (Step S702).

When it is determined in Step S702 that any audio data is not received ("No" in Step S702), the CPU 201b determines whether the remote conference is finished (Step S706). Finishing of the remote conference is performed, for example, in response to an instruction based on an operation on the operation device 206b by the participant, an instruction received from another remote conference terminal 110a through the communication I/F 207b, or the like.

When it is determined in Step S706 that the remote conference is not finished ("No" in Step S706), the CPU 201b returns to Step S702, and repeats the processes. When it is determined in Step S706 that the remote conference is finished ("Yes" in Step S706), the CPU 201b finishes the series of processes.

When it is determined in Step S702 that audio data is received ("Yes" in Step S702), the CPU 201b controls the communication I/F 207b, thereby storing the audio data in the reception buffer 390 (Step S703). Specifically, based on the mode type of the audio data received in Step S702, the CPU 201b outputs the audio data from the reception buffer 390 to the real time mode reception buffer 371 or the package mode reception buffer 372, such that the audio data is stored therein.

The CPU 201b determines whether there is any audio data transmitted in the real time mode, in the audio data stored in Step S703 (Step S704). Specifically, when there is any audio data stored in the real time mode reception buffer 371, the CPU 201b determines that there is audio data transmitted in the real time mode.

When it is determined in Step S704 that there is audio data transmitted in the real time mode ("Yes" in Step S704), the CPU 201b controls the audio I/F 205b, thereby decoding the audio data stored in the real time mode reception buffer 371 by the decoder 370, and controlling the speaker 213b such that the speaker 213b reproduces the audio data (Step S705).

If the audio data is reproduced, the CPU 201b determines whether the remote conference is finished (Step S706). Finishing of the remote conference is performed, for example, in response to an instruction based on an operation on the operation device 206b by the participant, an instruction received from another remote conference terminal 110a through the communication I/F 207b, or the like.

When it is determined in Step S706 that the remote conference is finished ("No" in Step S706), the CPU 201b returns to Step S702, and repeats the processes. When it is determined in Step S706 that the remote conference is finished ("Yes" in Step S706), the CPU 201b finishes the series of processes.

When it is determined in Step S704 that there is no audio data transmitted in the real time mode ("No" in Step S704), the CPU 201b determines whether there is any audio data transmitted in the package mode (Step S707). Specifically, the CPU 201b determines whether holding of any audio data in the package mode reception buffer 372 is completed.

When it is determined in Step S707 that there is no audio data transmitted in the package mode ("No" in Step S707), the CPU 201b proceeds with the process to Step S706, and when there is any audio data transmitted in the package mode ("Yes" in Step S707), the CPU 201b controls the audio IX 205b, thereby decoding the audio data stored in the package mode reception buffer 372 by the decoder 370, and controlling the speaker 213b such that the speaker 213b reproduces the audio data (Step S705).

Accordingly, audio data in the package mode does not have the real-time property but can surely reproduce audio. In other words, the audio data in the package mode may be reproduced late, but has an effect of reproducing accurate audio.

If the audio data is reproduced, the CPU 201b determines whether the remote conference is finished (Step S706). Finishing of the remote conference is performed, for example, in response to an instruction based on an operation on the operation device 206b by the participant, an instruction received from another remote conference terminal 110 through the communication I/F 207b, or the like.

When it is determined in Step S706 that the remote conference is not finished ("No" in Step S706), the CPU 201b returns to Step S702, and repeats the processes. When it is determined in Step S706 that the remote conference is finished ("Yes" in Step S706), the CPU 201b finishes the series of processes.

As described above, according to the illustrative embodiment of this disclosure, if the transmission mode for transmitting audio data is set to the package mode, it is possible to surely transmit audio data to the remote conference terminal 110 which is the reception destination. Also, in the remote conference terminal 110 which is the reception destination, since audio data transmitted in the real time mode is preferentially reproduced, it is possible to reproduce content of the remote conference without omission while securing the real-time property of the remote conference.

In the illustrative embodiment of this disclosure, in Step S602 shown in FIG. 6, it is repeatedly determined whether to transmit audio data in the package mode. However, the present invention is not limited thereto. Specifically, if audio data is once transmitted in the package mode, in the same remote conference, transmission of audio data in the package mode may continue. In this case, it is possible to reduce the load of the determining process of Step S602. Especially, in a case where a variation in the communication condition is small, even if the determining process is not performed a plurality of times, it is possible to perform an appropriate remote conference.

In a case of continuing the package mode, if transmission of audio data is completed in a short time, it may be determined that the communication condition is improved, and transmission of audio data according to the real time mode may be performed. In this case, it is possible to perform an appropriate remote conference and maximize the real-time property of the remote conference.

A function for informing the participants about whether to perform transmission of audio data in the package mode or in the real time mode may be additionally provided. In this case, it is possible to perform an appropriate remote conference and achieve unification of consciousness of the configuration.

Figure 9:
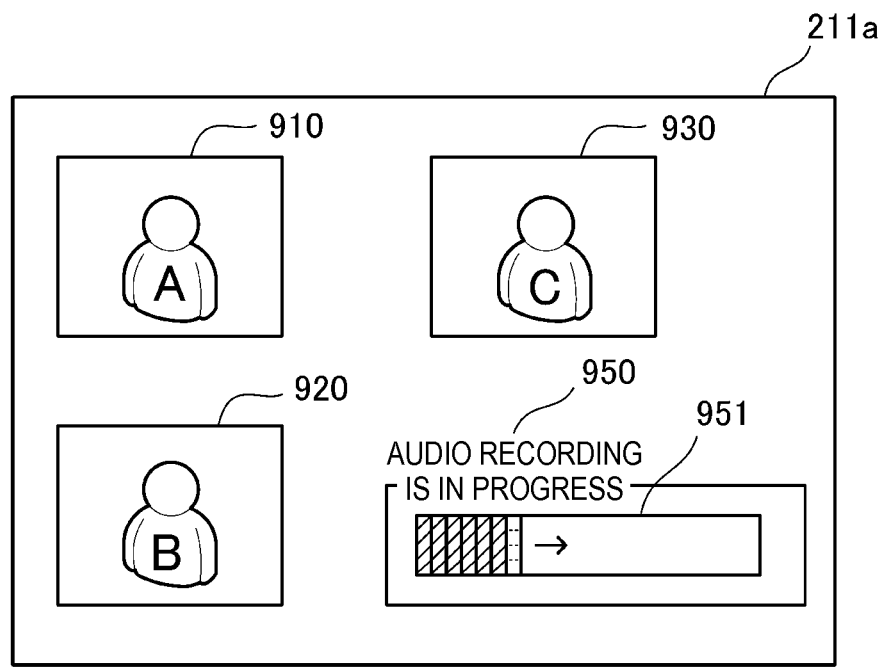
FIG. 9 is an explanatory view showing an example of display of a display of a remote conference terminal which is a transmission source according to a modified illustrative embodiment of this disclosure.
Figure 10:
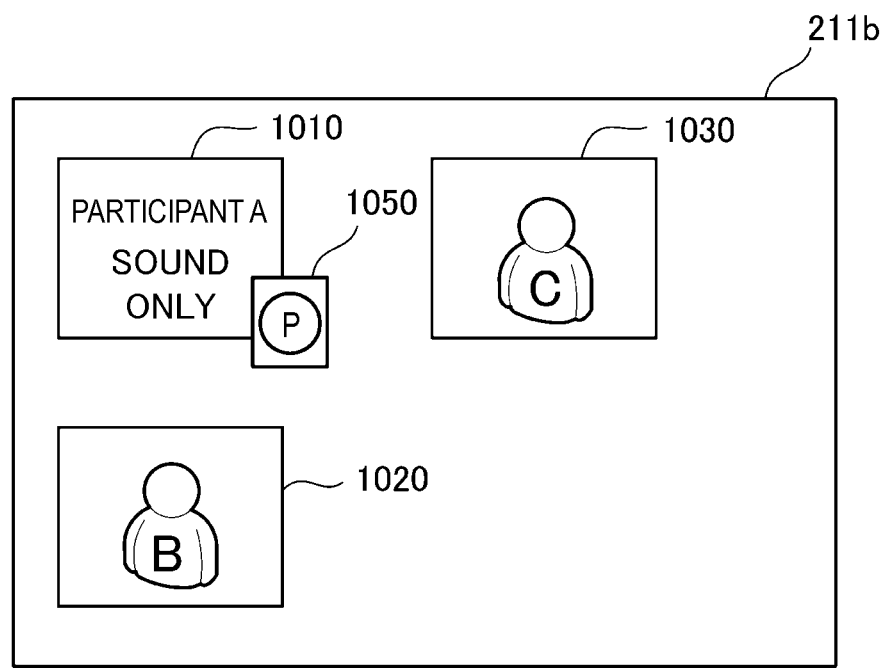
FIG. 10 is an explanatory view showing an example of display of a display of a remote conference terminal which is a reception destination according to a modified illustrative embodiment of this disclosure.

Next, display related to an audio data transmission mode according to a modified illustrative embodiment of this disclosure will be described with reference to FIGS. 9 to 11. In FIGS. 9 and 10, the remote conference terminals 110 shown in FIG. 1 will be described on the assumption that the remote conference terminal 110a is an audio data transmission source, and the remote conference terminal 110b is a reception destination.

In FIG. 9, according to control of the CPU 201a and the video of 204a, the remote conference terminal 110a displays an A screen 910, a B screen 920, and a C screen 930 which are images of the individual participants A, B and C, on the display 211a (an example of a display). When the audio data transmission mode is the package mode, the remote conference terminal 110a generates an audio record screen 950 representing the audio record condition of audio data from the participant A, in other words, an audio record data generation state by the CPU 201a and the video I/F 204a (an example of a generating unit). The audio record screen 950 displays a bar 951 having the predetermined amount of about 10 sec, which is recorded in the package mode, as the maximum, and represents data which has been recorded, data which is being recorded, and data which has not been recorded, from the left of the FIG. 9.

Based on the audio record screen, the participant A can confirm that the audio data of the participant A is transmitted in the package mode, and the audio data generation condition.

In FIG. 10, according to control of the CPU 201*b* and the video I/F 204*b*, the remote conference terminal 110*b* displays an A screen 1010, a B screen 1020, and a C screen 1030 which are images of the individual participants A, B and C, on the display 211*b* (an example of a display). When the transmission mode of audio data transmitted from the remote conference terminal 110*a* is the package mode, the remote conference terminal 110*b* synthesizes a package screen 1050 representing the package mode with the A screen 1010 by the CPU 201*b* and the video I/F 204*b* (an example of a generating unit), and displays the synthesized screen. Specifically, it may be possible to refer to the data type 502 of audio data 500 for the package mode being received, or to acquire information representing that audio data 500 is being transmitted from the remote conference terminal 110*a* in the package mode. Based on the package screen 1050, the participant B can grasp which participant transmits audio data in the package mode.

In FIGS. 9 and 10, display during the package mode is described. In the case of the real time mode, the audio record screen 950 and the package screen 1050 may be grayed out or deleted.

A display control process for displaying the screens of FIGS. 9 and 10 will be described with reference to FIG. 11. Here, the display control process shown in FIG. 11 is performed in each remote conference terminal 110, regardless of whether each remote conference terminal 110 is a transmission source or a reception destination. Similarly in the flow charts of FIGS. 6 and 7, the display control process is performed if the conference application which is for performing a remote conference and is stored in the storage medium 208 is started. In the remote conference terminal 110*a* which is the transmission source, the display control process is performed in parallel with the process shown in the flow chart of FIG. 6. In the remote conference terminal 110*b* which is the reception destination, the display control process is performed in parallel with the process shown in the flow chart of FIG. 7.

The CPU 201 determines whether a remote conference is started (Step S801). This determination is the same as the determination of Step S601 shown in FIG. 6, and thus will not be described.

In Step S802, the CPU 201 determines whether any video data is received from the management server 150. When it is determined in Step S802 that any video data is not received ("No" in Step S802), the CPU 201 determines whether the remote conference is finished (Step S810). Finishing of the remote conference is performed, for example, in response to an instruction based on an operation on the operation device 206 by the participant, an instruction received from another remote conference terminal 110 through the management server 150, or the like.

Meanwhile, when it is determined in Step S802 that video data is received ("Yes" in Step S802), the CPU 201 transmits an instruction for displaying the received video data on the display 211, to the video I/F 204.

In Step S804, the CPU 201 determines whether the corresponding remote conference terminal is transmitting audio data in the package mode. The CPU 201 performs that determination with reference to the mode setting stored in the RAM 202. When Step S612 of FIG. 6 is performed, whereby information representing that the transmission mode is set to the real time mode is stored in the RAM 202 ("No" in Step S804), the CPU 201 proceeds with the process to Step S807. Meanwhile, when Step S603 of FIG. 6 is performed, whereby information representing that the transmission mode is set to the package mode is stored in the RAM 202 ("Yes" in Step S804), the CPU 201 proceeds with the process to Step S805.

In Step S805, the CPU 201 generates the audio record screen 950. Thereafter, the CPU 201 transmits an instruction for synthesizing the generated audio record screen 950 with the received video data and displaying the synthesized screen on the display 211, to the video I/F 204 (Step S806).

In Step S807, the CPU 201 determines whether there is any audio data 500 in the package mode reception buffer 372. When there is no audio data 500 in the package mode reception buffer 372 ("No" in Step S807), the CPU 201 proceeds with the process to Step S810. Meanwhile, when there is audio data 500 in the package mode reception buffer 372 ("Yes" in Step S807), the CPU 201 proceeds with the process to Step S808.

In Step S808, the CPU 201 specifies another remote conference terminal 110 which transmitted the audio data in the package mode. Specifically, the CPU 201 acquires a terminal ID 501 included in the audio data 500 stored in the package mode reception buffer 372, thereby specifying another remote conference terminal 110 which transmitted the audio data 500.

In Step S809, the CPU 201 synthesizes and displays the package screen 1050 in the vicinity of the image position of the specified remote conference terminal 110. Specifically, the CPU 201 compares a terminal ID included in the video data received from the management server 150, with the terminal ID 501 acquired in Step S808, thereby determining the display position of the package screen 1050. Thereafter, the CPU 201 transmits an instruction for synthesizing the package screen 1050 in the vicinity of the image position of the specified remote conference terminal 110 and displaying the synthesized screen on the display 211, to the video I/F 204.

In Step S810, the CPU 201 determines whether the remote conference is finished. Finishing of the remote conference is performed, for example, in response to an instruction based on an operation on the operation device 206 by the participant, an instruction received from another remote conference terminal 110 through the communication I/F 207, or the like.

When the remote conference is not finished ("No" in Step S810), the CPU 201 returns to Step S802. Meanwhile, in a case where the remote conference is finished ("Yes" in Step S810), the CPU 201 finishes the series of processes.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A conference system configured to perform a remote conference by transmitting and receiving conference data among a plurality of terminals through a network, the terminals including a transmission terminal for transmitting conference data and a reception terminal for receiving the conference data, wherein the transmission terminal comprises:
   a first processor; and
   first memory storing first computer-readable instructions, the first instructions, when executed by the first processor, causing the transmission terminal to perform operations comprising:
   a receiving operation receiving input of the conference data, the conference data including audio data;
   a selecting operation selecting either one of a real time mode of sequentially performing transmission of the input audio data received by the receiving operation and a package mode of performing transmission of the input audio data for each input of a predetermined unit amount;

an audio recording operation recording the input audio data in the predetermined unit amount to generate audio record data when the package mode is selected by the selecting operation; and a communication control operation transmitting the input audio data to the reception terminal when the real time mode is selected by the selecting operation, and transmitting the audio record data to the reception terminal when the package mode is selected by the selecting operation, and wherein the reception terminal comprises:

a second processor; and second memory storing second computer-readable instructions, the second instructions, when executed by the second processor, causing the reception terminal to perform operations comprising:

a storing operation storing the input audio data transmitted by the communication control operation in a first storage device, and storing the audio record data transmitted by the communication control operation in a second storage device; and an outputting operation outputting the input audio data stored in the first storage device preferentially over the audio record data stored in the second storage device.

2. The conference system according to claim 1, wherein when the input audio data is stored in the first storage device, the outputting operation outputs the input audio data stored in the first storage device, and wherein when the input audio data is not stored in the first storage device, the outputting operation outputs the audio record data stored in the second storage device.

3. The conference system according to claim 1, wherein the selecting operation selects either one of the real time mode and the package mode based on a communication condition of the conference data which is transmitted and received among the terminals.

4. The conference system according to claim 3, wherein in a storage history of at least one of the input audio data and the audio record data in an storage area in the transmission terminal for storing the input audio data before transmission, when an oldest data of the at least one of the input audio data and the audio record data is stored longer than a predetermined period, the selecting operation selects the package mode.

5. The conference system according to claim 3, wherein the conference data further includes video data, and wherein when a number of pictures per unit time of the video data which is transmitted from the transmission terminal to the reception terminal and which is displayed in the reception terminal is less than a predetermined number, the selecting operation selects the package mode.

6. The conference system according to claim 1, wherein the conference data further includes video data, and wherein when the package mode is selected by the selecting operation, the communication control operation stops transmission of the video data to be transmitted from the transmission terminal.

7. The conference system according to claim 1, wherein the first instructions, when executed by the first processor, cause the transmission terminal to perform operations comprising:

a generating operation generating an image representing a generation state of the audio record data when the package mode is selected by the selecting operation; and a first display operation displaying the image which is generated by the generating operation and represents the generation state of the audio record data.

8. The conference system according to claim 1, wherein the second instructions, when executed by the second processor, cause the reception terminal to perform operations comprising:

a second display operation displaying an image representing that the package mode is selected in the transmission terminal when the audio record data is received from the transmission terminal.

9. The conference system according to claim 3, wherein the first instructions, when executed by the first processor, cause the transmission terminal to perform operations comprising:

an acquiring operation acquiring attribute information related to an attribute of a participant of the remote conference, and wherein the selecting operation selects either one of the real time mode and the package mode based on the communication condition and the attribute information acquired by the acquiring operation.

10. A non-transitory computer-readable medium having a computer program stored thereon and readable by a computer for controlling a terminal device for performing a remote conference by communicating conference data with a partner terminal connected through a network, the computer program, when executed by the computer, causing the computer to perform operations comprising:

a receiving operation receiving input of the conference data, the conference data including audio data;

a selecting operation selecting either one of a real time mode of sequentially performing transmission of the input audio data received by the receiving operation and a package mode of performing transmission of the input audio data for each input of a predetermined unit amount;

an audio recording operation recording the input audio data in the predetermined unit amount to generate audio record data when the package mode is selected by the selecting operation; and a communication control operation transmitting the input audio data to the partner terminal when the real time mode is selected by the selecting operation, and transmitting the audio record data to the reception terminal when the package mode is selected by the selecting operation.

11. The non-transitory computer-readable medium according to claim 10, wherein the selecting operation selects either one of the real time mode and the package mode based on a communication condition of the conference data which is transmitted and received between the terminal device and the partner terminal.

12. The non-transitory computer-readable medium according to claim 11, wherein in a storage history of at least one of the input audio data and the audio record data in an storage area in the terminal device for storing the input audio data before transmission, when an oldest data of the at least one of the input audio data and the audio record data is stored longer than a predetermined period, the selecting operation selects the package mode.

13. The non-transitory computer-readable medium according to claim 11,
wherein the conference data further includes video data, and
wherein when a number of pictures per unit time of the video data which is transmitted from the terminal device to the partner terminal and which is displayed in the partner terminal is less than a predetermined number, the selecting operation selects the package mode.

14. The non-transitory computer-readable medium according to claim 10,
wherein the conference data further includes video data, and
wherein when the package mode is selected by the selecting operation, the communication control operation stops transmission of the video data to be transmitted from the terminal device.

15. The non-transitory computer-readable medium according to claim 10,
wherein the computer program, when executed by the computer, causes the computer to perform operations comprising:
a generating operation generating an image representing a generation state of the audio record data when the package mode is selected by the selecting operation; and
a first display operation displaying the image which is generated by the generating operation and represents the generation state of the audio record data.

16. The non-transitory computer-readable medium according to claim 11,
wherein the computer program, when executed by the computer, causes the computer to perform operations comprising:
an acquiring operation acquiring attribute information related to an attribute of a participant of the remote conference, and
wherein the selecting operation selects either one of the real time mode and the package mode based on the communication condition and the attribute information acquired by the acquiring operation.

17. A non-transitory computer-readable medium having a computer program stored thereon and readable by a computer for controlling a terminal device for performing a remote conference by communicating conference data with a partner terminal connected through a network, the computer program, when executed by the computer, causing the computer to perform operations comprising:
a mode receiving operation receiving mode information representing either one of a real time mode of sequentially performing transmission of input audio data of the conference data received from the partner terminal, and a package mode of performing transmission of the input audio data in a predetermined unit amount;
a storing operation storing the input audio data received from the partner terminal in a first storage device, and storing audio record data which is acquired by recording the input audio data received by the partner terminal in the predetermined unit amount, in a second storage device; and
an outputting operation outputting the input audio data stored in the first storage device preferentially over the audio record data stored in the second storage device.

18. The non-transitory computer-readable medium according to claim 17,
wherein when the input audio data is stored in the first storage device, the outputting operation outputs the input audio data stored in the first storage device, and
wherein when the input audio data is not stored in the first storage device, the outputting operation outputs the audio record data stored in the second storage device.

19. The non-transitory computer-readable medium according to claim 17,
wherein the computer program, when executed by the computer, causes the computer to perform operations comprising:
a second display operation displaying an image representing that the package mode is selected in the partner terminal when the audio record data is received from the partner terminal.

20. A conference method of performing a remote conference by transmitting and receiving conference data among a plurality of terminals through a network, the terminals including a transmission terminal for transmitting conference data and a reception terminal for receiving the conference data, the conference method comprising:
by the transmission terminal,
receiving input of the conference data, the conference data including audio data;
selecting either one of a real time mode of sequentially performing transmission of the input audio data received by the receiving step and a package mode of performing transmission of the input audio data for each input of a predetermined unit amount;
recording the input audio data in the predetermined unit amount to generate audio record data when the package mode is selected by the selecting step; and
transmitting the input audio data to the reception terminal when the real time mode is selected by the selecting step, and transmitting the audio record data to the reception terminal when the package mode is selected by the selecting step, and
by the reception terminal,
storing the input audio data transmitted by the transmitting step in a first storage device, and storing the audio record data transmitted by the transmitting step in a second storage device; and
outputting the input audio data stored in the first storage device preferentially over the audio record data stored in the second storage device.

* * * * *